(12) United States Patent
Hauser et al.

(10) Patent No.: US 6,312,812 B1
(45) Date of Patent: Nov. 6, 2001

(54) COATED METAL SUBSTRATES AND METHODS FOR PREPARING AND INHIBITING CORROSION OF THE SAME

(75) Inventors: Brian T. Hauser, Murrysville; Ralph C. Gray, Butler; Richard M. Nugent, Jr., Allison Park; Michael L. White, Pittsburgh, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/469,259

(22) Filed: Dec. 21, 1999

Related U.S. Application Data

(62) Division of application No. 09/309,850, filed on May 11, 1999, now Pat. No. 6,168,868, and a division of application No. 09/309,849, filed on May 11, 1999, now Pat. No. 6,217,674, which is a continuation-in-part of application No. 09/203,833, filed on Dec. 1, 1998.

(60) Provisional application No. 60/133,617, filed on May 11, 1999, and provisional application No. 60/133,571, filed on May 11, 1999.

(51) Int. Cl.$^7$ .................................................. B32B 27/36
(52) U.S. Cl. ............................................................ 428/412
(58) Field of Search ............................................. 428/412

(56) References Cited

U.S. PATENT DOCUMENTS

| | | | |
|---|---|---|---|
| 3,067,045 | 12/1962 | McMahon | 106/14 |
| 3,382,081 | 5/1968 | Cutter et al. | 106/14 |
| 3,395,027 | 7/1968 | Klotz | 106/1 |
| 3,462,319 | 8/1969 | Campbell | 148/6.16 |
| 3,687,739 | 8/1972 | Kennedy et al. | 148/6.2 |
| 3,791,850 | 2/1974 | Deshay et al. | 117/75 |
| 3,912,548 | 10/1975 | Faigen | 148/6.15 R |
| 3,966,502 | 6/1976 | Binns | 148/6 |
| 4,079,163 | 3/1978 | Tanaka et al. | 428/328 |
| 4,132,572 | 1/1979 | Parant et al. | 148/6.15 R |
| 4,157,924 | 6/1979 | Elms et al. | 148/6.2 |
| 4,186,036 | 1/1980 | Elms et al. | 148/6.15 R |
| 4,346,143 | 8/1982 | Young, Jr. et al. | 428/332 |
| 4,705,726 | 11/1987 | Shindou et al. | 428/562 |
| 4,707,415 | 11/1987 | Ikeda et al. | 428/621 |
| 4,794,050 | 12/1988 | Campbell et al. | 428/551 |
| 4,933,056 | 6/1990 | Corrigan et al. | 204/181 |
| 4,941,930 | 7/1990 | Charles et al. | 148/260 |
| 5,034,556 | 7/1991 | Kahle, II | 558/155 |
| 5,129,967 | 7/1992 | Sander et al. | 148/247 |
| 5,209,788 | 5/1993 | McMillen et al. | 148/247 |
| 5,238,506 | 8/1993 | Cape et al. | 148/262 |
| 5,294,265 | 3/1994 | Gray et al. | 148/250 |
| 5,306,526 | 4/1994 | Gray et al. | 427/309 |
| 5,328,525 | 7/1994 | Musingo et al. | 148/247 |
| 5,342,456 | 8/1994 | Dolan | 148/247 |
| 5,344,504 | 9/1994 | Deck et al. | 148/243 |
| 5,449,415 | 9/1995 | Dolan | 148/259 |
| 5,530,043 | 6/1996 | Zawacky et al. | 524/317 |
| 5,534,082 | 7/1996 | Dollman et al. | 148/247 |
| 5,580,371 | 12/1996 | Falberg | 106/14.12 |
| 5,584,946 | 12/1996 | Karmaschek et al. | 148/247 |
| 5,652,024 | 7/1997 | Sanborn et al. | 427/383.7 |
| 5,653,790 | 8/1997 | McMillen et al. | 148/247 |
| 5,653,823 | 8/1997 | McMillen et al. | 148/247 |
| 5,662,746 | 9/1997 | Affinito | 148/247 |
| 5,760,107 | 6/1998 | Valko et al. | 523/404 |
| 5,801,217 | 9/1998 | Rodzewich et al. | 523/409 |
| 5,804,652 | 9/1998 | Jones et al. | 525/56 |
| 5,820,987 | 10/1998 | Kaufman et al. | 428/413 |

FOREIGN PATENT DOCUMENTS

| | | |
|---|---|---|
| 2087352 | 1/1994 | (CA) . |
| 061911 | 10/1982 | (EP) . |
| 0 157 392 | 10/1985 | (EP) . |
| 2237812 | 5/1991 | (GB) . |
| 59-83775 | 5/1984 | (JP) . |
| 57-192741 | 4/1991 | (JP) . |
| 10-44307 | 2/1998 | (JP) . |
| WO95/33869 | 12/1995 | (WO) . |
| WO96/27034 | 9/1996 | (WO) . |
| WO97/14822 | 4/1997 | (WO) . |
| WO98/18870 | 5/1998 | (WO) . |
| 94/5750 | 8/1994 | (ZA) . |

OTHER PUBLICATIONS

Periodic Table of the Elements, *CRC Handbook of Chemistry and Physics*, Weast, Chemical Rubber Publishing Co., 1962.

*Encyclopedia of Chemical Technology*, "Phosporus Compounds", 4th Ed., 1996, p. 772.

*Primary Examiner*—Terressa M. Boykin
(74) *Attorney, Agent, or Firm*—Deborah M. Altman

(57) ABSTRACT

The present invention provides a metal substrate coated with a first pretreatment composition including a transition element-containing material having one or more Group IIIB elements, Group IVB elements, lanthanide series elements or mixtures thereof; and a second pretreatment composition including a reaction product of at least one epoxy-functional material or derivative thereof and at least phosphorus-containing material, amine-containing material and/or sulfur-containing material deposited upon the first pretreatment composition. If desired, the first and second pretreatment compositions can be combined into a single pretreatment.

43 Claims, No Drawings

COATED METAL SUBSTRATES AND METHODS FOR PREPARING AND INHIBITING CORROSION OF THE SAME

CROSS-REFERENCE TO RELATED APPLICATIONS

This patent application is a continuation-in-part of the following: U.S. patent application Ser. No. 09/203,833 entitled "Weldable, Coated Metal Substrates And Methods For Preparing And Inhibiting Corrosion Of The Same", filed Dec. 1, 1998; U.S. Provisional Patent Application Ser. No. 60/133,617 entitled "Weldable, Coated Metal Substrates And Methods For Preparing And Inhibiting Corrosion Of The Same", filed May 11, 1999; U.S. Provisional Patent Application Ser. No. 60/133,571 entitled "Process for Mill-Applied Treatment of Sheet Metal", filed May 11, 1999; U.S. patent application Ser. No. 09/309,850 entitled "Process for Applying a Lead-Free Coating to Untreated Metal Substrates Via Electrodeposition", filed May 11, 1999, now U.S Pat. No. 6,168,868; and U.S. patent application Ser. No. 09/309,849 entitled "Compositions and Process for Treating Metal Substrates", filed May 11, 1999, now U.S. Pat. No. 6,217,674.

FIELD OF THE INVENTION

This invention relates generally to corrosion-resistant coated metal substrates and, more particularly, to ferrous and non-ferrous metal substrates having environmentally friendly chrome-free and nickel-free coatings thereon which inhibit corrosion of the metal substrate.

BACKGROUND OF THE INVENTION

Pretreating metal substrates with a phosphate conversion coating and rinsing with a chrome-containing sealer is well known for promoting corrosion resistance and improving the adhesion of subsequently applied decorative and protective coatings. Cationic electrodeposition compositions are typically applied over phosphated steel substrates to further improve corrosion resistance. While the combination of phosphate conversion coating and electrodeposited coating provides superior corrosion resistance, heavy metals typically used in such coatings can provide environmental disposal concerns. For example, phosphate conversion coating compositions typically contain heavy metals such as nickel and post-rinses contain chrome, while cationic electrodeposition compositions typically are formulated with lead as a pigment or soluble lead salt. Also, conventional phosphating processes can require eleven to twenty-five stages that occupy a large amount of physical space in a plant and require significant capital investment. Another drawback of conventional phosphating processes is difficulty in coating mixed-metal objects including aluminum.

Nickel-free phosphate coating compositions and chrome-free rinsing compositions having comparable corrosion resistance to nickel- and chrome-containing compositions are highly desirable. Rinsing compositions utilizing metal ions other than chromium are disclosed, for example, in U.S. Pat. Nos. 3,966,502 and 4,132,572. U.S. Pat. No. 3,966,502 discloses treatment of phosphated metals with zirconium-containing rinse solutions. U.S. Pat. Nos. 3,912,548, 5,209,788, and 5,653,823 disclose other rinse compositions containing combinations of Group IVB metal ions with polymeric materials that have been used over phosphated substrates. However, many post-rinse compositions are suitable for use over a limited number of substrates or over substrates that must be phosphated first.

It would be desirable to provide a simplified pretreatment process free of heavy metals for coating metal substrates, including mixed metal substrates such as are commonly found on today's automobile bodies. Such a pretreatment process, when combined with a lead-free electrodeposition process, would provide an environmentally friendly alternative for providing corrosion resistance to metal substrates.

SUMMARY OF THE INVENTION

The present invention provides a coated metal substrate comprising: (a) a metal substrate; (b) a first pretreatment composition deposited upon at least a portion of the substrate, the first pretreatment composition comprising a transition element-containing material which comprises a transition element selected from the group consisting of Group IIIB elements, Group IVB elements, lanthanide series elements and mixtures thereof; and (c) a second pretreatment composition comprising a reaction product of at least one epoxy-functional material or derivative thereof and at least one material selected from the group consisting of phosphorus-containing materials, amine-containing materials, sulfur-containing materials and mixtures thereof deposited upon at least a portion of the first pretreatment composition.

In another aspect of the present invention, a weldable, coated metal substrate is provided which comprises (a) a metal substrate; (b) a first pretreatment composition comprising a transition element-containing material which comprises a transition element selected from the group consisting of Group IIIB elements, Group IVB elements, lanthanide series elements and mixtures thereof deposited upon at least a portion of the substrate; (c) a second pretreatment composition comprising a reaction product of at least one epoxy functional material or derivative thereof and at least one material selected from the group consisting of phosphorus-containing materials, amine-containing materials, sulfur-containing materials and mixtures thereof deposited upon at least a portion of the first pretreatment composition; and (d) a weldable composition comprising an electroconductive pigment and a binder deposited upon at least a portion of the second pretreatment composition.

In another aspect of the present invention, a coated metal substrate is provided which comprises: (a) a metal substrate; (b) a first pretreatment composition comprising a transition element-containing material which comprises a transition element selected from the group consisting of Group IIIB elements, Group IVB elements, lanthanide series elements and mixtures thereof deposited upon at least a portion of the substrate; and (c) a second pretreatment composition comprising an ester of a phosphorus-containing material deposited upon at least a portion of the first pretreatment composition.

In another aspect of the present invention, a method for preparing a coated metal substrate is provided which comprises the steps of: (a) treating a surface of a metal substrate with a first pretreatment composition comprising a transition element-containing material which comprises a transition element selected from the group consisting of Group IIIB elements, Group IVB elements, lanthanide series elements and mixtures thereof; and (b) applying a second pretreatment composition comprising a reaction product of at least one epoxy functional material or derivative thereof and at least one material selected from the group consisting of phosphorus-containing materials, amine-containing materials, sulfur-containing materials and mixtures thereof over at least a portion of the first pretreatment composition to form a substrate having a pretreated surface.

In another aspect of the present invention, a method for inhibiting corrosion of a metal substrate is provided which comprises: (a) treating a surface of a metal substrate with a first pretreatment composition comprising a transition element-containing material which comprises a transition element selected from the group consisting of Group IIIB elements, Group IVB elements, lanthanide series elements and mixtures thereof; (b) applying a second pretreatment composition comprising a reaction product of at least one epoxy functional material or derivative thereof and at least one material selected from the group consisting of phosphorus-containing materials, amine-containing materials, sulfur-containing materials and mixtures thereof over at least a portion of the first pretreatment composition to form a substrate having a pretreated surface; and (c) applying a weldable coating to the pretreated surface to form a corrosion-resistant coated metal substrate, the weldable coating comprising an electroconductive pigment and a binder.

In another aspect of the present invention, a coated metal substrate is provide which comprises: (a) a metal substrate; and (b) a pretreatment composition deposited upon at least a portion of the substrate, the pretreatment composition comprising (1) a transition element-containing material which comprises a transition element selected from the group consisting of Group IIIB elements, Group IVB elements, lanthanide series elements and mixtures thereof; and (2) a reaction product of at least one epoxy-functional material or derivative thereof and at least one material selected from the group consisting of phosphorus-containing materials, amine-containing materials, sulfur-containing materials and mixtures thereof deposited upon at least a portion of the first pretreatment composition.

In another aspect of the present invention, a method for preparing a coated metal substrate is provided which comprises the step of treating a surface of a metal substrate with a pretreatment composition comprising (1) a transition element-containing material which comprises a transition element selected from the group consisting of Group IIIB elements, Group IVB elements, lanthanide series elements and mixtures thereof; and (2) a reaction product of at least one epoxy functional material or derivative thereof and at least one material selected from the group consisting of phosphorus-containing materials, amine-containing materials, sulfur-containing materials and mixtures thereof over at least a portion of the first pretreatment composition to form a substrate having a pretreated surface.

Other than in the operating examples, or where otherwise indicated, all numbers expressing quantities of ingredients, reaction conditions, and so forth used in the specification and claims are to be understood as being modified in all instances by the term "about". Also, as used herein, the term "polymer" is meant to refer to oligomers, homopolymers and copolymers.

DETAILED DESCRIPTION OF THE PREFERRED EMBODIMENTS

The metal substrates used in the practice of the present invention include ferrous metals, non-ferrous metals and combinations thereof. Suitable ferrous metals include iron, steel, and alloys thereof. Non-limiting examples of useful steel materials include cold rolled steel, hot galvanized (zinc coated) steel, electrogalvanized steel, stainless steel, pickled steel, zinc-iron alloy such as GALVANNEAL, GALVALUME and GALFAN zinc-aluminum alloys coated over steel, and combinations thereof. Useful non-ferrous metals include aluminum, zinc, magnesium and alloys thereof. Combinations or composites of ferrous and non-ferrous metals can also be used. The shape of the metal substrate can be in the form of a sheet, plate, bar, rod or any shape desired.

Before depositing the coating compositions of the present invention upon the surface of the metal substrate, it is preferred to remove dirt or foreign matter from the metal surface by thoroughly cleaning and degreasing the surface. The surface of the metal substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. Non-limiting examples of suitable alkaline cleaning agents include CHEMKLEEN 163 and CHEMKLEEN 177 phosphate cleaners that are commercially available from PPG Industries, Inc. of Pittsburgh, Pa.

Following the cleaning step, the surface of the metal substrate is usually rinsed with water, preferably deionized water, in order to remove any residue. Optionally, the metal surface can be rinsed with an aqueous acidic solution after cleaning with the alkaline cleaner and before contact with the passivating compositions. Examples of rinse solutions include mild or strong acidic cleaners such as the dilute nitric acid solutions commercially available and conventionally used in metal pretreatment processes. The metal substrate can be air dried using an air knife, by flashing off the water by brief exposure of the substrate to a high temperature or by passing the substrate between squeegee rolls.

Optionally, a phosphate-based conversion coating can be applied to the metal substrate. Suitable phosphate conversion coating compositions include those known in the art, such as zinc phosphate, optionally modified with nickel, iron, manganese, calcium, magnesium or cobalt. Useful phosphating compositions are described in U.S. Pat. Nos. 4,941,930, 5,238,506, and 5,653,790.

Following the optional acid rinsing and phosphating steps, the metal substrate is contacted with a first pretreatment or passivating composition that improves the corrosion resistance of the metal substrate compared to its corrosion resistance without such a treatment. The first pretreatment composition comprises one or more transition element-containing materials which comprise one or more transition elements selected from the group consisting of Group IIIB elements, Group IVB elements, lanthanide series elements and mixtures thereof. The Group IIIB elements, Group IVB elements and lanthanide series elements referred to herein are those elements included in such groups in the CAS Periodic Table of the Elements as shown, for example, in the Handbook of Chemistry and Physics, (56th Ed. 1975) inside cover, which are hereby incorporated by reference.

Preferred Group IIIB elements include yttrium, lanthanum and mixtures thereof. Preferred lanthanide series elements include cerium, praseodymium, neodymium, samarium, europium, dysprosium and mixtures thereof. Preferred Group IVB elements include zirconium, titanium, hafnium and mixtures thereof. Mixtures of Group IIIB, Group IVB and/or lanthanide series elements can be used. Zirconium- and titanium-containing materials are preferred.

Non-limiting examples of suitable Group IIIB transition element-containing materials include nitrates, acetates, sulfamates, lactates, glycolates, formates and dimethylol propionates of yttrium and/or lanthanum, where such compounds exist. Non-limiting examples of suitable lanthanide series transition element-containing materials include nitrates, acetates, sulfamates, lactates, glycolates, formates and dimethylol propionates of cerium, praseodymium, neodymium, samarium, europium and/or dysprosium, where such compounds exist.

Non-limiting examples of suitable zirconium-containing materials include fluorozirconic acids, such as hexafluorozirconic acid, alkali metal and ammonium salts thereof such as potassium hexafluorozirconate, alkali or amine salts of zirconium hexafluoride; ammonium zirconium carbonate; zirconyl nitrate; zirconium carboxylates such as zirconium acetate, zirconium oxalate, ammonium zirconium glycolate, ammonium zirconium lactate, ammonium zirconium citrate, and mixtures thereof. Hexafluorozirconic acid is preferred. Non-limiting examples of suitable titanium-containing materials include fluorotitanic acid, alkali salts of hexafluorotitanate, amine salts of hexafluorotitanate and mixtures thereof.

The first pretreatment composition typically is dispersed or dissolved in a carrier medium, such as an aqueous medium. Preferably, the transition element-containing materials are in the form of metal salts or acids that are water soluble. The transition element-containing materials can be present in the carrier medium in an amount of up to about 10,000 ppm, preferably about 10 to about 2000 ppm metal, and more preferably about 100 to about 1000 ppm metal based on total weight of the composition. The pH of the medium is usually about 2.0 to about 7.0, preferably about 3 to about 5. The pH of the medium may be adjusted using mineral acids such as hydrofluoric acid, fluoroboric acid, phosphoric acid, and the like, including mixtures thereof; organic acids such as lactic acid, acetic acid, citric acid, sulfamic acid, or mixtures thereof; and water soluble or water dispersible bases such as sodium hydroxide, ammonium hydroxide, ammonia, or amines such as triethylamine, methylethanol amine, or mixtures thereof.

Additionally, the first pretreatment composition can comprise one or more film-forming materials or resins. Suitable resins include reaction products of one or more alkanolamines and an epoxy-functional material containing at least two epoxy groups, such as those disclosed in U.S. Pat. No. 5,653,823. Preferably, such resins contain beta hydroxy ester, imide, or sulfide functionality, incorporated by using dimethylolpropionic acid, phthalimide, or mercaptoglycerine as an additional reactant in the preparation of the resin. Alternatively, the reaction product is that of the diglycidyl ether of Bisphenol A (commercially available from Shell Chemical Company as EPON 880 or EPON 828 LC), dimethylol propionic acid, and diethanolamine in a 0.6 to 5.0:0.05 to 5.5:1 mole ratio. Other suitable resins include water soluble and water dispersible polyacrylic acids as disclosed in U.S. Pat. Nos. 3,912,548 and 5,328,525; phenol-formaldehyde resins as described in U.S. Pat. No. 5,662,746, incorporated herein by reference; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449,415.

In this embodiment of the invention, the film forming resin is present in the first pretreatment coating composition in an amount of 0.005% to 30% based on the total weight of the first pretreatment composition, and the transition element-containing material is present in an amount of 10 to 10,000, preferably 100 to 2000 ppm metal based on total weight of the first pretreatment composition. The weight ratio of the resin to transition element-containing materials is from 2.0 to 10.0, preferably 3.0 to 5.0, based on metal.

The pretreatment coating composition can further comprise one or more crosslinking materials for crosslinking crosslinkable components of the composition, such as the film-forming resin. Useful crosslinking materials include blocked or unblocked polyisocyanates, aminoplasts, polyacids, polyanhydrides and mixtures thereof such as are well known to those skilled in the art. The amount of the crosslinking material in the pretreatment coating composition can range from about 0.05 to about 60 weight percent on a basis of total resin solids weight of the pretreatment coating composition.

The pretreatment coating composition can further comprise surfactants that function as aids to improve wetting of the substrate. Generally, the surfactant materials are present in an amount of less than about 2 weight percent on a basis of total weight of the pretreatment coating composition. Other optional materials in the carrier medium include surfactants that function as defoamers or substrate wetting agents.

Preferably, the pretreatment coating composition is essentially free of chromium-containing materials, i.e., contains less than about 2 weight percent of chromium-containing materials (expressed as $CrO_3$), and more preferably less than about 0.05 weight percent of chromium-containing materials. Examples of such chromium-containing materials include chromic acid, chromium trioxide, chromic acid anhydride, and chromate and dichromate salts of ammonium, sodium, potassium, calcium, barium, zinc and strontium. Most preferably, the pretreatment coating composition is free of chromium-containing materials.

The first pretreatment composition is deposited upon at least a portion of an exposed surface of the metal substrate. Preferably, the entire exposed surface of the metal substrate is coated with the first pretreatment composition.

The first pretreatment composition can be applied to the metal substrate by known application techniques, such as dipping or immersion, which is preferred, spraying, intermittent spraying, dipping followed by spraying, spraying followed by dipping, brushing, or by roll-coating. Typically, the solution or dispersion when applied to the metal substrate is at a temperature ranging from 60 to 150° F. (15 to 65° C.). The contact time is generally between less than one second and five minutes, preferably 30 seconds to 2 minutes.

Continuous coating processes are typically used in the coil coating industry and also for mill application. The first pretreatment coating composition can be applied by any of these conventional processes. For example, in the coil industry, the substrate is cleaned and rinsed and then usually contacted with the pretreatment coating composition by roll coating with a chemical coater. The treated strip is then dried by heating and painted and baked by conventional coil coating processes.

Optionally, the pretreatment composition can be applied in a mill by immersion, spray or roll coating the freshly manufactured metal strip. Excess pretreatment composition is typically removed by wringer rolls. After the first pretreatment composition has been applied to the metal surface, the metal can be rinsed with deionized water and dried at room temperature or at elevated temperatures to remove excess moisture from the treated substrate surface and cure any curable coating components to form the first pretreatment coating. Alternately, the treated substrate can be heated at about 65° C. to about 250° C. for about 2 seconds to about 1 minute to produce a coated substrate having a dried or cured residue of the first pretreatment coating composition thereon. If the substrate is already heated from the hot melt production process, no post application heating of the treated substrate is required to facilitate drying. The temperature and time for drying the coating will depend upon such variables as the percentage of solids in the coating, components of the coating composition and type of substrate.

The film coverage of the residue of the first pretreatment composition generally ranges from about 0.1 to about 500 milligrams per square meter (mg/m$^2$), and is preferably about 0.1 to about 1 mg/m$^2$. The thickness of the first pretreatment composition can vary, but is generally less than about 1 micrometer, preferably ranges from about 1 to about 500 nanometers, and more preferably is about 10 to about 300 nanometers.

In the present invention, a second pretreatment composition is deposited upon at least a portion of the first pretreatment composition. The second pretreatment composition comprises a reaction product of one or more epoxy-functional materials or derivatives thereof and one or more materials selected from phosphorus-containing materials, amine-containing materials, sulfur-containing materials and mixtures thereof.

Useful epoxy-functional materials contain at least one epoxy or oxirane group in the molecule, such as monoglycidyl ethers of a monohydric phenol or alcohol or di- or polyglycidyl ethers of polyhydric alcohols. Preferably, the epoxy-functional material contains at least two epoxy groups per molecule and has aromatic or cycloaliphatic functionality to improve adhesion to the metal substrate. Further, it is preferred that the epoxy-functional materials be relatively more hydrophobic than hydrophilic in nature.

Examples of suitable monoglycidyl ethers of a monohydric phenol or alcohol include phenyl glycidyl ether and butyl glycidyl ether. Useful polyglycidyl ethers of polyhydric alcohols can be formed by reacting epihalohydrins with polyhydric alcohols, such as dihydric alcohols, in the presence of an alkali condensation and dehydrohalogenation catalyst such as sodium hydroxide or potassium hydroxide. Useful epihalohydrins include epibromohydrin, dichlorohydrin and epichlorohydrin (preferred). Suitable polyhydric alcohols can be aromatic, aliphatic or cycloaliphatic.

Non-limiting examples of suitable aromatic polyhydric alcohols include phenols that are preferably at least dihydric phenols. Non-limiting examples of aromatic polyhydric alcohols useful in the present invention include dihydroxybenzenes, for example resorcinol, pyrocatechol and hydroquinone; bis(4-hydroxyphenyl)-1,1-isobutane; 4,4-dihydroxybenzophenone; bis(4-hydroxyphenyl)-1,1-ethane; bis(2-hydroxyphenyl)methane; 1,5-hydroxynaphthalene; 4-isopropylidene bis(2,6-dibromophenol); 1,1,2,2-tetra(p-hydroxy phenyl)-ethane; 1,1,3-tris(p-hydroxy phenyl)-propane; novolac resins; bisphenol F; long-chain bisphenols; and 2,2-bis(4-hydroxyphenyl)propane, i.e., bisphenol A (preferred).

Non-limiting examples of aliphatic polyhydric alcohols include glycols such as ethylene glycol, diethylene glycol, triethylene glycol, 1,2-propylene glycol, 1,4-butylene glycol, 2,3-butylene glycol, pentamethylene glycol, polyoxyalkylene glycol; polyols such as sorbitol, glycerol, 1,2, 6-hexanetriol, erythritol and trimethylolpropane; and mixtures thereof. An example of a suitable cycloaliphatic alcohol is cyclohexanedimethanol.

Suitable epoxy-functional materials have an epoxy equivalent weight ranging from about 100 to about 4000, and preferably about 100 to about 500, as measured by titration with perchloric acid using methyl violet as an indicator. Useful epoxy-functional materials are disclosed in U.S. Pat. Nos. 5,294,265; 5,306,526 and 5,653,823, which are hereby incorporated by reference.

Examples of suitable commercially available epoxy-functional materials are EPON® 828 LC (880), 1001, 1002, 1004, 1007, 1009, 826 and 828 epoxy resins, which are epoxy functional polyglycidyl ethers of bisphenol A prepared from bisphenol-A and epichlorohydrin and are commercially available from Shell Chemical Company. EPON® 828 epoxy resin has a number average molecular weight of about 400 and an epoxy equivalent weight of about 185–192. EPON® 826 epoxy resin has an epoxy equivalent weight of about 178–186.

Other useful epoxy-functional materials include epoxy-functional acrylic polymers, glycidyl esters of carboxylic acids and mixtures thereof.

Useful derivatives of epoxy-functional materials include the reaction products of one or more epoxy-functional materials such as are discussed above with one or more substituted aldehydes or ketones or mixtures thereof. Suitable hydroxy-substituted aldehydes and ketones include 4-hydroxybenzaldehyde, 3-hydroxybenzaldehyde, 2-hydroxybenzaldehyde (salicylaldehyde), vanillin, syringaldehyde, 2'-hydroxyacetophenone, 3'-hydroxyacetophenone, 4'-hydroxyacetophenone, 4'-hydroxy-2'-methylacetophenone, 4'-hydroxy-4'-methylacetophenone and 2,4-dihydroxybenzophenone. Useful amino substituted aldehydes and ketones include 2'-aminoacetophenone, 3'-aminoactophenone and 4'-aminoacetophenone. Suitable carboxy substituted aldehydes and ketones include 2-carboxybenzaldehyde, 3-carboxybenzaldehyde, 4-carboxybenzaldehyde and succinic semialdehyde.

An example of a useful derivative of an epoxy-functional material is the reaction product of a polyglycidyl ether of bisphenol A and 4-hydroxybenzaldehyde.

As discussed above, the epoxy-containing material or derivative thereof can be reacted with one or more phosphorus-containing materials to form an ester thereof, such as an organophosphate or organophosphonate. Suitable phosphorus-containing materials include phosphinic acids, phosphonic acids, phosphoric acids, phosphites, phosphonites and mixtures thereof.

Examples of suitable phosphinic acids include those having at least one group of the structure:

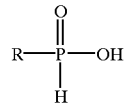

where R can be H, —C—, —(CH$_2$)$_n$— where n is an integer from 1 to about 18, —O—CO—(CH$_2$)$_2$—, and preferably is an aryl group such as a phenyl group. A preferred phosphinic acid is phenyl phosphinic acid (benzene phosphinic acid). Other useful phosphinic acids include glyphosate-3 and hypophosphorous acid.

Examples of suitable phosphonic acids include those having at least one group of the structure:

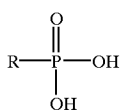

where R can be H, —C—, —(CH$_2$)$_n$— where n is an integer from 1 to about 18, —O—CO—(CH$_2$)$_2$—, and preferably is an aryl group such as a phenyl group. A preferred phosphonic acid is phenyl phosphonic acid.

Non-limiting examples of other suitable phosphonic acids include phosphorous acid, 1-hydroxyethylidene-1,1-diphosphonic acid, methylene phosphonic acids, and alpha-aminomethylene phosphonic acids containing at least one group of the structure:

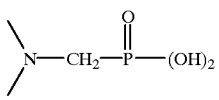

such as (2-hydroxyethyl)aminobis(methylene phosphonic) acid, isopropylaminobis(methylenephosphonic) acid and other aminomethylene phosphonic acids disclosed in U.S. Pat. No. 5,034,556 at column 2, line 52 to column 3, line 43, which is hereby incorporated by reference.

Other useful phosphonic acids include alpha-carboxymethylene phosphonic acids containing at least one group of the structure:

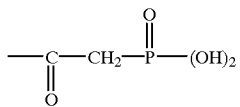

such as phosphonoacetic acid.

Other examples of useful phosphonic acids include benzylaminobis(methylene phosphonic) acid, cocoaminobis (methylene phosphonic) acid, triethylsilylpropylamino (methylene phosphonic) acid and carboxyethyl phosphonic acid.

Suitable esters of phosphorus-containing materials include esters of any of the phosphinic acids, phosphonic acids or phosphoric acid discussed above, for example phosphoric acid esters of bisphenol A diglycidyl ether, benzylaminobis(methylenephosphonic) ester of bisphenol A diglycidyl ether, carboxyethyl phosphonic acid ester of bisphenol A diglycidyl ether, phenylglycidyl ether and butyl glycidyl ether; carboxyethyl phosphonic acid mixed ester of bisphenol A diglycidyl ether and butylglycidyl ether; triethoxyl silyl propylaminobis(methylenephosphonic) acid ester of bisphenol A diglycidyl ether and cocoaminobis (methylenephosphonic) acid ester of bisphenol A diglycidyl ether.

The epoxy-containing material or derivative thereof and phosphorus-containing material are typically reacted in an equivalent ratio of about 1:0.5 to about 1:10, and preferably about 1:1 to about 1:4. The epoxy-functional material or derivative and phosphorus-containing material can be reacted together by any method well known to those skilled in the art, such as a reverse phosphatization reaction in which the epoxy-containing material is added to the phosphorus-containing material.

Typically, the reaction product of the epoxy-functional material or derivative and phosphorus-containing material has a number average molecular weight of up to about 10,000, and preferably about 500 to about 1000, as measured by gel permeation chromatography using polystyrene as a standard.

In an alternative embodiment, the pretreatment coating comprises one or more esters of a phosphorus-containing material, for example such as are discussed above. Other suitable esters include the reaction product of phosphorus pentoxide as P$_4$O$_{10}$ and an alcohol in a 1:6 molar ratio of oxide to alcohol to produce a mixture of mono- and diphosphate esters, such as is disclosed in the 18 *Encyclopedia of Chemical Technology*, (4$^{th}$ Ed. 1996) at page 772, which is hereby incorporated by reference. Examples of suitable alcohols include aliphatic alcohols such as ethylene glycol, phenols such as bisphenol A, and cycloaliphatic alcohols.

In an alternative preferred embodiment, the reaction product can be formed from one or more epoxy-containing materials or derivatives, such as are discussed above, and one or more amine-containing materials selected from primary amines, secondary amines, tertiary amines and mixtures thereof. Non-limiting examples of suitable primary amines include n-butyl amine and fatty amines such as ARMEEN 18D which is commercially available from Akzo Nobel. Suitable secondary amines include diisopropanolamine, diethanolamine and di-butyl amine. An example of a useful tertiary amine is ARMEEN DM18D dimethyl C18 tertiary amine.

Preferably, the amine-containing material comprises at least one alkanolamine or a mixture of different alkanolamines. Primary or secondary alkanolamines are preferred, however tertiary alkanolamines can be used. Preferred alkanolamines include alkanol groups containing less than about 20 carbon atoms, and more preferably less than about 10 carbon atoms. Non-limiting examples of suitable alkanolamines include methylethanolamine, ethylethanolamine, diethanolamine (preferred), methylisopropanolamine, monoethanolamine and diisopropanolamine. Preferred tertiary alkanolamines contain two methyl groups, such as dimethylethanolamine.

The epoxy-functional material or derivative and amine-containing material are preferably reacted in an equivalent ratio ranging from about 5:1 to about 0.25:1, and more preferably about 2:1 to about 0.5:1. The epoxy-functional material or derivative and amine-containing material can be reacted together by any method well known to those skilled in the art of polymer synthesis, such as solution or bulk polymerization techniques. For example, an alkanolamine can be added to an epoxy-functional material and diluent, mixed at a controlled rate and the mixture heated at a controlled temperature under a nitrogen blanket or other procedure well known to those skilled in the art for reducing the presence of oxygen during the reaction. Suitable diluents for reducing the viscosity of the mixture during the reaction include alcohols containing up to about 8 carbon atoms, such as ethanol or isopropanol; and glycol ethers such as the monoalkyl ethers of ethylene glycol, diethylene glycol or propylene glycol.

If a tertiary alkanolamine is used, a quaternary ammonium compound is formed. Typically, this reaction is carried out by adding all of the raw materials to the reaction vessel at the same time and heating the mixture, usually with a diluent, at a controlled temperature. Usually, an acid such as a carboxylic acid is present to ensure that the quaternary ammonium salt is formed rather than a quaternary ammonium hydroxide. Suitable carboxylic acids include lactic acid, citric acid, adipic acid and acetic acid (preferred). Quaternary ammonium salts are useful because they are more easily dispersed in water and can be used to form an aqueous dispersion having a pH near the desired application range.

Generally, the reaction product of the epoxy-functional material or derivative and amine-containing material has a number average molecular weight of up to about 10,000, and preferably about 500 to about 750, as measured by gel permeation chromatography using polystyrene as a standard.

The second pretreatment composition can include one or more film-forming materials and/or crosslinking materials such as are discussed in detail above for the first pretreatment composition in similar amounts.

In another alternative embodiment, the reaction product can be formed from one or more epoxy-containing materials or derivatives, such as are discussed above, and one or more sulfur-containing materials such as aliphatic or aromatic mercaptans, sulfonates, sulfones, sulfoniums, sulfides, sulfoxides and mixtures thereof.

A treating solution of one or more of any of the reaction products discussed above can be prepared by mixing the reaction product(s) with a diluent, such as water, preferably at a temperature of about 10° C. to about 70° C., and more preferably about 15° C. to about 25° C. Preferably, the reaction product is soluble or dispersible in water diluent to the extent of at least about 0.03 grams per 100 grams of water at a temperature of about 25° C. The reaction product generally comprises about 0.05 to about 10 weight percent of the treating solution on a total weight basis.

Useful diluents include water or mixtures of water and cosolvents. Suitable cosolvents include alcohols having up to about 8 carbon atoms, such as ethanol and isopropanol; and alkyl ethers of glycols, such as 1-methoxy-2-propanol, monoalkyl ethers of ethylene glycol, diethylene glycol and propylene glycol and dialkyl ethers of ethylene glycol or ethylene glycol formal. Preferably, the diluent includes a propylene glycol monomethyl ether such as DOWANOL PM, dipropylene glycol monomethyl ether DOWANOL DPM, which are commercially available from Dow Chemical Company or MAZON 1651 butyl carbitol formal which is commercially available from BASF Corp. Other useful diluents include bases such as amines which can partially or completely neutralize the organophosphate or organophosphonate to enhance the solubility of the compound. Non-limiting examples of suitable amines include secondary amines, such as diisopropanolamine (preferred), and tertiary amines such as triethylamine, dimethylethanolamine and 2-amino-2-methyl-1-propanol. Non-aqueous diluents are typically present in amount ranging from about 0.1 to about 5 weight percent on a basis of total weight of the treating solution. Water can be present in amount ranging from about 50 to about 99 weight percent on a basis of total weight of the treating solution.

Typically, water-soluble or water-dispersible acids and/or bases are used to adjust the pH of the treating solution to about 2 to about 9, and preferably about 3 to about 5. Suitable acids include mineral acids, such as hydrofluoric acid, fluoroboric acid, phosphoric acid, sulfamic acid and nitric acid; organic acids, such as lactic acid, acetic acid, hydroxyacetic acid, citric acid; and mixtures thereof. Suitable bases include inorganic bases, such as sodium hydroxide and potassium hydroxide; nitrogen-containing compounds such as ammonia, triethylamine, methanolamine, diisopropanolamine; and mixtures thereof.

Optionally, the second pretreatment composition further comprises a fluorine-containing material as a source of fluoride ions. Suitable fluorine-containing materials include hydrofluoric acid, fluorosilicic acid, fluoroboric acid, sodium hydrogen fluoride, potassium hydrogen fluoride, ammonium hydrogen fluoride and mixtures thereof. Preferably, the concentration of fluorine-containing material in the pretreatment coating ranges from about 100 to about 5200 parts per million (ppm) and more preferably about 300 to about 3500 ppm. Generally, the weight ratio of reaction product to fluoride ions ranges from about 10:1 to about 55:1.

The fluorine-containing material can be applied to the metal substrate prior to application of the second pretreatment composition or included in the second pretreatment composition itself. If applied prior to application of the treating solution, the pH of an aqueous solution including the fluorine-containing material generally ranges from about 2.4 to about 4.0 and can be adjusted by adding sodium hydroxide.

Optionally, the second pretreatment composition can further comprise one or more transition element-containing materials such as are discussed above. Generally, the transition element-containing material is included in the treating solution in an amount to provide a concentration of up to about 10,000 ppm, and preferably about 500 to about 2000 ppm, based upon total weight of the treating solution.

The treating solution can further comprise surfactants that function as aids to improve wetting of the substrate. Generally, the surfactant materials are present in an amount of less than about 2 weight percent on a basis of total weight of the treating solution.

Preferably, the second pretreatment composition is essentially free of chromium-containing materials, i.e., contains less than about 2 weight percent of chromium-containing materials (expressed as $CrO_3$), and more preferably less than about 0.05 weight percent of chromium-containing materials. Examples of such chromium-containing materials include chromic acid, chromium trioxide, chromic acid anhydride, and chromate and dichromate salts of ammonium, sodium, potassium, calcium, barium, zinc and strontium. Most preferably, the treating solution is free of chromium-containing materials.

In a preferred embodiment, the reaction product of an epoxy-functional material and a phosphorus-containing material is formed from EPON® 880 (828 LC) epoxy-functional resin and phenylphosphonic acid in an equivalent ratio of about 1:1 to about 1:2. The reaction product is present in the treating solution in an amount of about 0.1 weight percent on a basis of total weight of the treating solution. The preferred treating solution also includes diisopropanolamine, solvent and deionized water.

In an alternative preferred embodiment, the reaction product of an epoxy functional material and phosphorus-containing material is formed from the reaction product of (a) EPON® 880 (828 LC) epoxy-functional resin and 4-hydroxybenzaldehyde in an equivalent ratio of about 1:1 and (b) phenylphosphinic acid in an equivalent ratio of about 1:1. The reaction product is present in the treating solution in an amount of about 0.1 weight percent on a basis of total weight of the treating solution. The preferred treating solution also includes diisopropanolamine, solvent and deionized water.

In an alternative embodiment, the components of the first and second pretreatment compositions can be present in a single pretreatment composition.

The treating solution is applied to the surface of the metal substrate by any conventional application technique, such as spraying, immersion or roll coating in a batch or continuous process. The temperature of the treating solution at application is typically about 10° C. to about 85° C., and preferably about 15° C. to about 40° C. The pH of the preferred treating solution at application generally ranges from about 2.0 to about 9.0, and is preferably about 3 to about 5.

The film coverage of the residue of the pretreatment coating generally ranges from about 0.1 to about 1000 milligrams per square meter ($mg/m^2$), and is preferably about 1 to about 400 $mg/m^2$.

Optionally, a weldable coating can be deposited upon at least a portion of the pretreatment coating formed from the first and second pretreatment compositions. The weldable coating is formed from a weldable composition comprising one or more electroconductive pigments which provide electroconductivity to the weldable coating and one or more binders which adhere the electroconductive pigment to the pretreatment coating. The overall thickness of the pretreatment coating over which the weldable coating is applied can vary, but is generally less than about 1 micrometer, preferably ranges from about 1 to about 500 nanometers, and more preferably is about 10 to about 300 nanometers.

Non-limiting examples of suitable electroconductive pigments include zinc (preferred), aluminum, iron, graphite, iron phosphide, nickel, tungsten and mixtures thereof. Preferred zinc particles are commercially available from ZINCOLI GmbH as ZINCOLI S 620 or 520. The average particle size (equivalent spherical diameter) of the electroconductive pigment particles generally is less than about 10 micrometers, preferably ranges from about 1 to about 5 micrometers, and more preferably about 3 micrometers.

Since the metal substrates are to be subsequently welded, the weldable coating must comprise a substantial amount of electroconductive pigment, generally greater than about 10 volume percent and preferably about 30 to about 60 volume percent on a basis of total volume of electroconductive pigment and binder.

The binder is present to secure the electroconductive pigment to the pretreatment coating. Preferably, the binder forms a generally continuous film when applied to the surface of the pretreatment coating. Generally, the amount of binder can range from about 5 to about 50 weight percent of the weldable coating on a total solids basis, preferably about 10 to about 30 weight percent and more preferably about 10 to about 20 weight percent.

The binder can comprise oligomeric binders, polymeric binders and mixtures thereof. The binder is preferably a resinous polymeric binder material selected from thermosetting binders, thermoplastic binders or mixtures thereof. Non-limiting examples of suitable thermosetting materials include polyesters, epoxy-containing materials such as are discussed above, phenolics, polyurethanes, and mixtures thereof, in combination with crosslinkers such as aminoplasts or isocyanates which are discussed below. Non-limiting examples of suitable thermoplastic binders include high molecular weight epoxy resins, defunctionalized epoxy resins, vinyl polymers, polyesters, polyolefins, polyamides, polyurethanes, acrylic polymers and mixtures thereof. Another useful binder material is a phenoxy polyether polyol.

Particularly preferred binder materials are polyglycidyl ethers of polyhydric phenols, such as those discussed above, having a weight average molecular weight of at least about 2000 and preferably ranging from about 5000 to about 100,000. These materials can be epoxy functional or defunctionalized by reacting the epoxy groups with phenolic materials. Such binders can have epoxy equivalent weights of about 2000 to about one million. Non-limiting examples of useful epoxy resins are commercially available from Shell Chemical Company as EPON® epoxy resins. Preferred EPON® epoxy resins include EPON® 1009, which has an epoxy equivalent weight of about 2300–3800. Useful epoxy defunctionalized resins include EPONOL resin 55-BK-30 which is commercially available from Shell.

Suitable crosslinkers or curing agents are described in U.S. Pat. No. 4,346,143 at column 5, lines 45–62 and include blocked or unblocked di- or polyisocyanates such as DESMODUR® BL 1265 toluene diisocyanate blocked with caprolactam, which is commercially available from Bayer, and aminoplasts such as etherified derivatives of urea-melamine- and benzoguanamine-formaldehyde condensates which are commercially available from Cytec Industries under the trademark CYMEL® and from Solutia under the trademark RESIMENE®.

Preferably, the weldable coating composition comprises one or more diluents for adjusting the viscosity of the composition so that it can be applied to the metal substrate by conventional coating techniques. The diluent should be selected so as not to detrimentally affect the adhesion of the weldable coating to the pretreatment coating upon the metal substrate. Suitable diluents include ketones such as cyclohexanone (preferred), acetone, methyl ethyl ketone, methyl isobutyl ketone and isophorone; esters and ethers such as 2-ethoxyethyl acetate, propylene glycol monomethyl ethers such as DOWANOL PM, dipropylene glycol monomethyl ethers such as DOWANOL DPM or propylene glycol methyl ether acetates such as PM ACETATE which is commercially available from Dow Chemical; and aromatic solvents such as toluene, xylene, aromatic solvent blends derived from petroleum such as SOLVESSO® 100. The amount of diluent can vary depending upon the method of coating, the binder components and the pigment-to-binder ratio, but generally ranges from about 10 to about 50 weight percent on a basis of total weight of the weldable coating.

The weldable coating can further comprise optional ingredients such as phosphorus-containing materials, including metal phosphates or the organophosphates discussed in detail above; inorganic lubricants such as GLEITMO 1000S molybdenum disulfide particles which are commercially available from Fuchs of Germany; coloring pigments such as iron oxides; flow control agents; thixotropic agents such as silica, montmorillonite clay and hydrogenated castor oil; anti-settling agents such as aluminum stearate and polyethylene powder; dehydrating agents which inhibit gas formation such as silica, lime or sodium aluminum silicate; and wetting agents including salts of sulfonated castor oil derivatives such as DEHYSOL R.

Other pigments such as carbon black, magnesium silicate (talc), zinc oxide and corrosion inhibiting pigments including calcium modified silica, zinc phosphate and molybdates such as calcium molybdate, zinc molybdate, barium molybdate and strontium molybdate and mixtures thereof can be included in the weldable coating. Generally, these optional ingredients comprise less than about 20 weight percent of the weldable coating on a total solids basis, and usually about 5 to about 15 weight percent. Preferably, the weldable coating is essentially free of chromium-containing materials, i.e., comprises less than about 2 weight percent of chromium-containing materials and more preferably is free of chromium-containing materials.

The preferred weldable coating includes EPON® 1009 epoxy-functional resin, zinc dust, salt of a sulfated castor oil derivative, silica, molybdenum disulfide, red iron oxide, toluene diisocyanate blocked with caprolactam, melamine resin, dipropylene glycol methyl ether, propylene glycol methyl ether acetate and cyclohexanone.

The weldable coating can be applied to the surface of the pretreatment coating by any conventional method well known to those skilled in the art, such as dip coating, direct roll coating, reverse roll coating, curtain coating, air and airless spraying, electrostatic spraying, pressure spraying, brushing such as rotary brush coating or a combination of any of the techniques discussed above.

The thickness of the weldable coating can vary depending upon the use to which the coated metal substrate will be subjected. Generally, to achieve sufficient corrosion resistance for coil metal for automotive use, the applied weldable coating should have a film thickness of at least about 1 micrometer (about 0.04 mils), preferably about 1 to about 20 micrometers and more preferably about 2 to about 5 micrometers. For other substrates and other applications, thinner or thicker coatings can be used.

After application, the weldable coating is preferably dried and/or any curable components thereof are cured to form a dried residue of the weldable coating upon the substrate. The dried residue can be formed at an elevated temperature ranging up to about 300° C. peak metal temperature. Many of the binders such as those prepared from epoxy-containing materials require curing at an elevated temperature for a period of time sufficient to vaporize any diluents in the coating and to cure or set the binder. In general, baking temperatures will be dependent upon film thickness and the components of the binder. For preferred binders prepared from epoxy-containing materials, peak metal temperatures of about 150° C. to about 300° C. are preferred.

After the weldable coating has been dried and/or cured, the metal substrate can be stored or forwarded to other operations, such as forming, shaping, cutting and/or welding operations to form the substrate into parts such as fenders or doors and/or to a subsequent electrocoat or topcoating operations. While the metal is being stored, transported or subjected to subsequent operations, the coatings protect the metal surface from corrosion, such as white and red rust, due to exposure to atmospheric conditions.

Since the coated metal substrate prepared according to the present invention is electroconductive, topcoating of the coated substrate by electrodeposition is of particular interest. Compositions and methods for electrodepositing coatings are well known to those skilled in the art and a detailed discussion thereof is not believed to be necessary. Useful compositions and methods are discussed in U.S. Pat. No. 5,530,043 (relating to anionic electrodeposition) and U.S. Pat. Nos. 5,760,107, 5,820,987 and 4,933,056 (relating to cationic electrodeposition) which are hereby incorporated by reference.

The weldable coated metal substrate optionally can be coated with a metal phosphate coating, such as zinc phosphate, which is deposited upon at least a portion of the weldable coating. Methods of application and compositions for such metal phosphate coatings are disclosed in U.S. Pat. Nos. 4,941,930 and 5,238,506, which are hereby incorporated by reference.

The pretreatment coating and weldable coating provide the metal substrate of the present invention with improved adhesion and flexibility and resistance to humidity, salt spray corrosion and components of subsequently applied coatings. In addition, the disposal and use problems associated with chromium can be reduced or eliminated.

The present invention will now be illustrated by the following specific, non-limiting examples. All parts and percentages are by weight unless otherwise indicated.

EXAMPLE

In accordance with the present invention, the following example shows the preparation of first and second pretreatment compositions, their application to ferrous and galvanized substrates and comparative corrosion testing results of the coated substrates.

Preparation of Panels for Corrosion Testing

Bare, or untreated cold rolled steel (CRS), two-sided electrogalvanized (EZG-60G) steel, two-sided hot-dipped galvanized (HDG-G70 70U) steel and two-sided hot-dipped GALVANNEAL (HDA-Zn/Fe A45) test panels were purchased from ACT Laboratories, Inc. of Hillsdale, Mich. Each panel was about 10.16 centimeters (cm) (4 inches) wide, about 15.24 cm (6 inches) long and about 0.76 to 0.79 mm (0.030 to 0.031 inches) thick.

The test panels were treated according to the process described in Table 1 below.

TABLE 1

| STAGE | PROCESS | DESCRIPTION |
|---|---|---|
| 1 | CLEAN | Chemkleen 163[1] (2% by volume) sprayed at 140° F. for 1 minute |
| 2 | RINSE | Tap water, 15–30 second immersion, ambient temperature |
| 3 | TREAT | Fluorozirconic acid[2] (175 ppm Zr; pH 4.5) 60 second immersion at ambient temperature |
| 4 | RINSE | Deionized water, 15–30 second immersion, ambient temperature |
| 5 | TREAT | Apply Pretreatment Solution A or B described below |
| 6 | RINSE | Deionized water, 15–30 second immersion, ambient temperature |

[1]Alkaline based cleaner commercially available from PPG Industries, Inc., Pittsburgh, PA
[2]Available as a 45% solution from Alfa Aesar, Ward Hill, MA As used herein, "ambient temperature" means an air temperature of about 20–26° C. Each pretreatment composition was adjusted to the pH indicated below with 10% sodium hydroxide or 1% sulfamic acid, measured at ambient temperatures using a Digital Ionalyzer Model SA720, commercially available from Orion Research.

Preparation and Application of Pretreatment Solutions A and B

In a preferred embodiment of the present invention, an epoxy ester of phenyl phosphonic acid was prepared in the following manner. To a 4-neck 1 liter round-bottom flask fitted with a reflux condenser, a mechanical stirrer and a nitrogen inlet, was charged at ambient temperature 79 grams (0.5 mole) of phenylphosphonic acid (available from Aldrich Chemical Co.) and 184.3 grams of propylene glycol monomethylether (available from Dow Chemical Co. as Dowanol PM). The mixture was heated with stirring to 51 degrees C. while maintaining a nitrogen blanket.

A solution comprising 94 grams of EPON 880 epoxy-based resin (available from Shell Chemical Co.) (0.25 mole) in 219.3 grams of Dowanol PM was added to the flask at 51 degrees C. over 44 minutes. The reaction mixture was then held at 50–51 degrees C. for 196 minutes at which time the epoxy equivalent weight was determined to be >30,000 as measured by potentiometric titration with perchloric acid. To the reaction mixture was then added over 7 minutes, a solution of 33.3 grams of diisopropanol amine (0.25 mole) in 77.7 grams of Dowanol PM while the temperature increased to 53 degrees C. The mixture was mixed thoroughly and poured into a plastic container for storage. The product mixture had a solids content of 33.2% (measured @ 110 degrees C. for 1 hour) and an acid number of 59.8 (measured by potentiometric titration with methanolic KOH).

To form Pretreatment Solution A, 3.01 g of the epoxy based reaction product described above was added to a portion of deionized water with stirring. Enough deionized water was then added to bulk the solution to form one liter of solution. The pH of Pretreatment Solution A was then adjusted to a value of 4.5 by dropwise addition of 10% sodium hydroxide.

In an alternative embodiment of the present invention, an epoxy aldehyde modified with phenyl phosphinic acid was prepared as follows. 75.20 g of EPON 880 epoxy-based resin (0.4 equiv.), 48.85 g of 4-Hydroxybenzaldehyde (0.4 equiv.), 0.11 g of Ethyltriphenylphosphonium iodide were charged at room temperature into a 4-neck 1 liter round-bottom flask fitted with a reflux condenser, a mechanical stirrer and a nitrogen inlet. The reaction mixture was heated to 130° C. and 2.07 g of methyl isobutyl ketone was the charged into the flask. The sample was then held for 2½ hours and then 0.37 g of benzyl dimethylamine and 11.64 g of MIBK were charged to the reaction. After 3 hours, the epoxy equivalent weight was 44,000. Phenylphosphinic acid (56.84 g (0.4 equiv.)) was added to the flask and the reaction was held for an additional three hours. The reaction was cooled to 90° C. and 53.38 g of diisopropanolamine and 484.11 g of DI $H_2O$ were charged to the flask. The final product had a pH of 8.5 and a number average molecular weight of 666 by GPC in DMF. The product mixture had a solids content of 31.91% (110° C.; 1 hr.), and an acid number of 28.6 (measured by potentiometric titration with methanolic KOH).

To prepare Pretreatment Solution B, 3.13 g of the epoxy based reaction product described above was added to a portion of deionized water with stirring. Enough deionized water was then added to bulk the solution to one liter. The pH of the pretreatment solution was then adjusted to a value of 4.5 by dropwise addition of 10% sodium hydroxide to form Pretreatment Solution B.

Performance in Corrosion Testing

Metal panels were coated using the process described in Table 1 and evaluated for corrosion resistance. These include panels which were cleaned but not pretreated; those which were cleaned and treated with fluorozirconic acid (FZA) (Table 1, Stages 1–4 only); those in which a solution of phenyl phosphonic acid was used in Stage 5 instead of Pretreatment Solutions A or B; panels which were pretreated with FZA and either Pretreatment Solution A or B; and panels that were cleaned and phosphated with either CHEMFOS 850 or CHEMFOS 700 phosphating solutions and rinsed with CHEMSEAL 59 non-chrome containing post-rinse solution (which are commercially available from PPG Industries, Inc.).

Each panel was electrocoated with ED 6650, an electrodepositable coating commercially available from PPG Industries, Inc. Electrocoated panels were cured to achieve a metal temperature of 340° F. for 20 minutes. The overall coating thickness was about 23 microns (0.9 mils) on each panel.

Three different corrosion resistance tests were performed on the panels, according to the Honda Salt Dip (warm salt water immersion—5% NaCl in deionized water solution at 55° C.), GM 9540P (Cycle B) and VDA 621-415 Test Procedures (Association of German Automobile Manufacturers). Before placing panels into test, they were scribed with either a large X for testing in warm salt water immersion testing, a straight vertical line for Cycle B testing, or 2 parallel lines for VDA-621-415 testing. Upon completion of corrosion testing, corrosion by-products and delaminated paint were removed by sand blasting according to warm salt water immersion and Cycle B test specifications or by pulling off with an adhesive tape according to VDA 621-415. Results obtained from these tests are summarized in Tables 2–4 below.

TABLE 2

| | | CORROSION TEST PROTOCOL total paint loss from scribe (mm) | | |
|---|---|---|---|---|
| SUBSTRATE TESTED | TREATMENT APPLIED[1] | WARM SALT WATER[2] | GM 9540 P CYCLE B[3] | VDA 621-415[4] |
| Cold Rolled Steel | Clean only (Stages 1–2) | 12–16 | 13.0 | 4.66 |
| Cold Rolled Steel | FZA only (Stages 1–4) | 6–8 | 9.8 | 3.83 |
| Cold Rolled Steel | Phenyl phosphonic acid[5] (in Stage 5) | 5–8 | 9.0 | — |
| Cold Rolled Steel | FZA/Pretreatment Solution A | 2–4 | 7.6 | 1.43 |
| Cold Rolled Steel | FZA/Pretreatment Solution B | 2–5 | — | — |
| Cold Rolled Steel | CHEMFOS 850/ CHEMSEAL 59 | 0–1 | 5.0 | 0.90 |
| Cold Rolled Steel | CHEMFOS 700/ CHEMSEAL 59 | 0–1 | 4.0 | — |
| Electrogalvanized Steel EZG 60 G | Clean only (Stages 1–2) | 6–11 | 4.33 | 2.53 |
| Electrogalvanized Steel EZG 60 G | FZA only (Stages 1–4) | 4–10 | 2.33 | 2.36 |
| Electrogalvanized Steel EZG 60 G | Phenyl phosphonic acid[5] (in Stage 5) | 4–8 | 3.66 | — |
| Electrogalvanized Steel EZG 60 G | FZA/Pretreatment Solution A | 2–7 | 3.33 | 2.33 |
| Electrogalvanized Steel EZG 60 G | FZA/Pretreatment Solution B | 2–8 | — | — |

TABLE 2-continued

| | | CORROSION TEST PROTOCOL total paint loss from scribe (mm) | | |
|---|---|---|---|---|
| SUBSTRATE TESTED | TREATMENT APPLIED[1] | WARM SALT WATER[2] | GM 9540 P CYCLE B[3] | VDA 621-415[4] |
| Electrogalvanized Steel EZG 60 G | CHEMFOS 850/ CHEMSEAL 59 | 1–6 | 3.0 | 1.60 |
| Electrogalvanized Steel EZG 60 G | CHEMFOS 700/ CHEMSEAL 59 | 0–4 | 3.33 | — |

[1]via process in Table 1 except for phosphated panels.
[2]10 day immersion; average range (in mm) of paint loss from scribe for 3 panels.
[3]40 cycles completed; value is average maximum paint loss from scribe of 3 panels.
[4]German cyclic automotive test run for 10 weeks. Scribe loss, $U_d$, calculated by measuring the total scribe creep along one of 2 parallel scribes in seven locations and using the following equation: $U_d = [U_1 + U_2 + \ldots + U_7)/7]/2$.
[5]Commercially available from Acros Organics (a division of Fisher Scientific, USA); used at 0.3 g/L and pH 4.5.

TABLE 3

| | | CORROSION TEST PROTOCOL total paint loss from scribe (mm) | | |
|---|---|---|---|---|
| SUBSTRATE TESTED | TREATMENT APPLIED | WARM SALT WATER | GM 9540 P CYCLE B | VDA 621-415 |
| Hot dipped galvanized steel (HDG G70) | Clean only | 2–6 | 2.66 | 1.83 |
| Hot dipped galvanized steel (HDG G70) | FZA only | 1–5 | 1.66 | 1.23 |
| Hot dipped galvanized steel (HDG G70) | Phenyl phosphonic acid | 1–4 | 3.0 | — |
| Hot dipped galvanized steel (HDG G70) | FZA/Pretreatment Solution A | 0–2 | 1.33 | 1.96 |
| Hot dipped galvanized steel (HDG G70) | CHEMFOS 850/ CHEMSEAL 59 | 1–3 | 2.33 | 1.03 |
| Hot dipped galvanized steel (HDG G70) | CHEMFOS 700/ CHEMSEAL 59 | 0–2 | 1.33 | — |

TABLE 4

| | | CORROSION TEST PROTOCOL total paint loss from scribe (mm) | |
|---|---|---|---|
| SUBSTRATE TESTED | TREATMENT APPLIED | WARM SALT WATER | GM 9540 P CYCLE B |
| GALVANNEAL (HDA-Zn/Fe A45) | Clean only | 2–5 | 4.66 |
| GALVANNEAL (HDA-Zn/Fe A45) | FZA only | 0–4 | 4.00 |
| GALVANNEAL (HDA-Zn/Fe A45) | FZA/Pretreatment Solution A | 0–2 | 3.33 |
| GALVANNEAL (HDA-Zn/Fe A45) | CHEMFOS 850/ CHEMSEAL 59 | 1–4 | 3.33 |
| GALVANNEAL (HDA-Zn/Fe A45) | CHEMFOS 700/ CHEMSEAL 59 | 0–3 | 2.33 |

The data in Tables 2–4 above demonstrate that the process described in Table 1 using a pretreatment of fluorozirconic acid and Pretreatment Solution A or B according to the present invention offers a useful alternative pretreatment method to standard phosphate conversion coatings. The effectiveness of this pretreatment on a variety of substrates, particularly on cold rolled steel, an inherently difficult substrate on which to inhibit corrosion, is highly desirable.

The coating compositions of the present invention provide a heavy metal-free alternative to conventional phosphating compositions; (2) a simpler operating procedure which is effective at ambient temperatures; (3) permits coating of objects comprised of mixed metallic substrates; and (4) significantly reduces the amount of heavy metal sludge typically produced with conventional phosphating treatments, thus eliminating disposal concerns.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore, we claim:

1. A coated metal substrate comprising:
   (a) a metal substrate;
   (b) a first pretreatment composition deposited upon at least a portion of the substrate, the first pretreatment composition comprising a transition element-containing material which comprises a transition element selected from the group consisting of Group IIIB elements, Group IVB elements, lanthanide series elements and mixtures thereof; and
   (c) a second pretreatment composition comprising a reaction product of at least one epoxy-functional material or derivative thereof and at least one material selected from the group consisting of phosphorus-containing materials, amine-containing materials, sulfur-containing materials and mixtures thereof deposited upon at least a portion of the first pretreatment composition.

2. The coated metal substrate according to claim 1, wherein the metal substrate comprises a ferrous metal.

3. The coated metal substrate according to claim 2, wherein the ferrous metal is selected from the group consisting of iron, steel and alloys thereof.

4. The coated metal substrate according to claim 3, wherein the ferrous metal comprises steel selected from the group consisting of cold rolled steel, galvanized steel, electrogalvanized steel, stainless steel and combinations thereof.

5. The coated metal substrate according to claim 1, wherein the metal substrate comprises a non-ferrous metal selected from the group consisting of aluminum, zinc, magnesium and alloys thereof.

6. The coated metal substrate according to claim 1, wherein the Group IIIB element comprises yttrium.

7. The coated metal substrate according to claim 1, wherein the lanthanide series element is selected from the group consisting of cerium, praseodymium, neodymium, samarium, europium, dysprosium and mixtures thereof.

8. The coated metal substrate according to claim 1, wherein the Group IVB element is selected from the group consisting of zirconium, titanium, hafnium and mixtures thereof.

9. The coated metal substrate according to claim 8, wherein the transition element-containing material comprises zirconium and is selected from the group consisting of fluorozirconic acid, potassium hexafluorozirconate, alkali salts of zirconium hexafluoride, amine salts of zirconium hexafluoride, ammonium zirconium carbonate, zirconyl nitrate, zirconium carboxylates and mixtures thereof.

10. The coated metal substrate according to claim 8, wherein the transition element-containing material comprises titanium and is selected from the group consisting of fluorotitanic acid, alkali salts of hexafluorotitanate, amine salts of hexafluorotitanate and mixtures thereof.

11. The coated metal substrate according to claim 1, wherein the first pretreatment composition further comprises a film-forming material.

12. The coated metal substrate according to claim 1, wherein the first pretreatment composition further comprises a carrier medium.

13. The coated metal substrate according to claim 1, wherein the first pretreatment composition is essentially free of chromium-containing materials.

14. The coated metal substrate according to claim 1, wherein the epoxy-functional material of the second pretreatment composition is the reaction product of an epihalohydrin with a polyhydric alcohol.

15. The coated metal substrate according to claim 14, wherein the epoxy-functional material is a polyglycidyl ether of bisphenol A.

16. The coated metal substrate according to claim 1, wherein the derivative of the epoxy functional material is the reaction product of (1) an epoxy functional compound and (2) an aldehyde or ketone.

17. The coated metal substrate according to claim 16, wherein the derivative of the epoxy functional material is the reaction product of (1) a polyglycidyl ether of bisphenol A and (2) hydroxybenzaldehyde.

18. The coated metal substrate according to claim 1, wherein the phosphorus-containing material of the second pretreatment composition is selected from the group consisting of phosphoric acids, phosphinic acids, phosphonic acids, phosphites, phosphonites and mixtures thereof.

19. The coated metal substrate according to claim 17, wherein the reaction product of the second pretreatment composition is selected from the group consisting of epoxy esters of phosphoric acid, epoxy esters of phosphonic acid, epoxy esters of phosphinic acid and mixtures thereof.

20. The coated metal substrate according to claim 1, wherein the amine-containing material is selected from the group consisting of primary amines, secondary amines, tertiary amines and mixtures thereof.

21. The coated metal substrate according to claim 19, wherein the amine-containing material comprises at least one alkanolamine.

22. The coated metal substrate according to claim 1, wherein the sulfur-containing material is selected from the group consisting of mercaptans, sulfonates, sulfones, sulfoniums, sulfides, sulfoxides and mixtures thereof.

23. The coated metal substrate according to claim 1, wherein the second pretreatment composition is essentially free of chromium-containing materials.

24. The coated metal substrate according to claim 1, wherein the second pretreatment composition further comprises at least one secondary amine which is different from the amine-containing material from which the reaction product is formed.

25. The coated metal substrate according to claim 24, wherein the secondary amine is diissopropanol amine.

26. The coated metal substrate according to claim 1, wherein the second pretreatment composition further comprises a fluorine-containing material.

27. The coated metal substrate according to claim 26, wherein the fluorine-containing material is selected from the group consisting of hydrofluoric acid, fluorosilicic acid, sodium hydrogen fluoride, potassium hydrogen fluoride, ammonium hydrogen fluoride and mixtures thereof.

28. The coated metal substrate according to claim 1, wherein the second pretreatment composition further comprises a transition element-containing material which comprises a transition element selected from the group consisting of Group IIIB elements, Group IVB elements, lanthanide series elements and mixtures thereof.

29. The coated metal substrate according to claim 1, further comprising (c) a weldable composition comprising an electroconductive pigment and a binder deposited upon at least a portion of the second pretreatment composition.

30. The coated metal substrate according to claim 29, wherein the electroconductive pigment is selected from the group consisting of zinc, aluminum, iron, graphite, iron phosphide, nickel, tungsten and mixtures thereof.

31. The coated metal substrate according to claim 29, wherein the binder comprises a thermosetting binder selected from the group consisting of polyesters, epoxy-containing materials, phenolics, aminoplasts, polyurethanes and mixtures thereof.

32. The coated metal substrate according to claim 29, wherein the binder comprises a thermoplastic binder selected from the group consisting of vinyl polymers, polyesters, polyolefins, polyamides, polyurethanes, acrylic polymers and mixtures thereof.

33. The coated metal substrate according to claim 29, wherein the weldable composition further comprises a crosslinker for crosslinking the thermosetting binder.

34. The coated metal substrate according to claim 29, further comprising a metal phosphate coating deposited upon at least a portion of the weldable composition.

35. The coated metal substrate according to claim 34, further comprising (d) an electrodeposited coating deposited upon at least a portion of the weldable composition.

36. A weldable, coated metal substrate comprising:
(a) a metal substrate;
(b) a first pretreatment composition comprising a transition element-containing material which comprises a transition element selected from the group consisting of Group IIIB elements, Group IVB elements, lanthanide series elements and mixtures thereof deposited upon at least a portion of the substrate;
(c) a second pretreatment composition comprising a reaction product of at least one epoxy functional material or derivative thereof and at least one material selected from the group consisting of phosphorus-containing materials, amine-containing materials, sulfur-containing materials and mixtures thereof deposited upon at least a portion of the first pretreatment composition; and (d) a weldable composition comprising an electroconductive pigment and a binder deposited upon at least a portion of the second pretreatment composition.

37. A coated metal substrate comprising:

(a) a metal substrate;

(b) a first pretreatment composition comprising a transition element-containing material which comprises a transition element selected from the group consisting of Group IIIB elements, Group IVB elements, lanthanide series elements and mixtures thereof deposited upon at least a portion of the substrate; and (c) a second pretreatment composition comprising an ester of a phosphorus-containing material deposited upon at least a portion of the first pretreatment composition.

38. The coated metal substrate according to claim 37, wherein the ester of the phosphorus-containing material is selected from the group consisting of phosphoric acid esters of epoxy-containing materials and phosphonic acid esters of epoxy-containing materials.

39. A method for preparing a coated metal substrate, comprising the steps of:

(a) treating a surface of a metal substrate with a first pretreatment composition comprising a transition element-containing material which comprises a transition element selected from the group consisting of Group IIIB elements, Group IVB elements, lanthanide series elements and mixtures thereof; and (b) applying a second pretreatment composition comprising a reaction product of at least one epoxy functional material or derivative thereof and at least one material selected from the group consisting of phosphorus-containing materials, amine-containing materials, sulfur-containing materials and mixtures thereof over at least a portion of the first pretreatment composition to form a substrate having a pretreated surface.

40. The method according to claim 39, further comprising an additional step (c) of applying a weldable composition to the pretreated surface to form a weldable, coated metal substrate, the weldable composition comprising an electroconductive pigment and a binder.

41. A method for inhibiting corrosion of a metal substrate comprising:

(a) treating a surface of a metal substrate with a first pretreatment composition comprising a transition element-containing material which comprises a transition element selected from the group consisting of Group IIIB elements, Group IVB elements, lanthanide series elements and mixtures thereof;

(b) applying a second pretreatment composition comprising a reaction product of at least one epoxy functional material or derivative thereof and at least one material selected from the group consisting of phosphorus-containing materials, amine-containing materials, sulfur-containing materials and mixtures thereof over at least a portion of the first pretreatment composition to form a substrate having a pretreated surface; and (c) applying a weldable coating to the pretreated surface to form a corrosion-resistant coated metal substrate, the weldable coating comprising an electroconductive pigment and a binder.

42. A coated metal substrate comprising:

(a) a metal substrate; and (b) a pretreatment composition deposited upon at least a portion of the substrate, the pretreatment composition comprising (1) a transition element-containing material which comprises a transition element selected from the group consisting of Group IIIB elements, Group IVB elements, lanthanide series elements and mixtures thereof; and (2) a reaction product of at least one epoxy-functional material or derivative thereof and at least one material selected from the group consisting of phosphorus-containing materials, amine-containing materials, sulfur-containing materials and mixtures thereof deposited upon at least a portion of the first pretreatment composition.

43. A method for preparing a coated metal substrate, comprising the step of treating a surface of a metal substrate with a pretreatment composition comprising (1) a transition element-containing material which comprises a transition element selected from the group consisting of Group IIIB elements, Group IVB elements, lanthanide series elements and mixtures thereof; and (2) a reaction product of at least one epoxy functional material or derivative thereof and at least one material selected from the group consisting of phosphorus-containing materials, amine-containing materials, sulfur-containing materials and mixtures thereof over at least a portion of the first pretreatment composition to form a substrate having a pretreated surface.

* * * * *